(12) United States Patent
Miyabe et al.

(10) Patent No.: US 11,057,144 B2
(45) Date of Patent: Jul. 6, 2021

(54) OPTICAL TRANSMISSION APPARATUS, METHOD FOR SETTING WAVELENGTH, AND OPTICAL TRANSCEIVER

(71) Applicant: FUJITSU LIMITED, Kawasaki (JP)

(72) Inventors: Masatake Miyabe, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/677,291

(22) Filed: Nov. 7, 2019

(65) Prior Publication Data
US 2020/0195365 A1 Jun. 18, 2020

(30) Foreign Application Priority Data
Dec. 17, 2018 (JP) .............................. JP2018-235924

(51) Int. Cl.
*H04J 14/02* (2006.01)
*H04B 10/071* (2013.01)
*H04B 10/572* (2013.01)

(52) U.S. Cl.
CPC ........ *H04J 14/0241* (2013.01); *H04B 10/071* (2013.01); *H04B 10/572* (2013.01); *H04J 14/0291* (2013.01)

(58) Field of Classification Search
CPC .... H04B 10/71; H04B 10/079; H04B 10/075; H04B 10/071; H04B 10/25; H04B 10/572; H04J 14/241; H04J 14/02
USPC ...................................................... 398/116
See application file for complete search history.

(56) References Cited

U.S. PATENT DOCUMENTS

| | | | | |
|---|---|---|---|---|
| 5,396,569 A | * | 3/1995 | Yanagawa | .......... G01M 11/3136 250/227.15 |
| 5,815,294 A | * | 9/1998 | Ishikawa | ............... H04L 7/0037 398/158 |
| 8,325,330 B2 | * | 12/2012 | Hasegawa | .......... G01M 11/3172 356/73.1 |
| 10,181,900 B2 | * | 1/2019 | Champavere | ........ H04B 10/572 |
| 10,432,302 B1 | * | 10/2019 | Delgado | ............ G01M 11/3154 |
| 2001/0038478 A1 | * | 11/2001 | Hwang | ............... H04B 10/2589 398/79 |
| 2004/0175177 A1 | * | 9/2004 | Lee | .................... H04B 10/2589 398/72 |
| 2007/0077072 A1 | * | 4/2007 | Kunimatsu | .......... H04J 14/0246 398/135 |
| 2010/0316373 A1 | * | 12/2010 | Chang | ................ H04B 10/2972 398/12 |

(Continued)

FOREIGN PATENT DOCUMENTS

| | | |
|---|---|---|
| JP | 6-117961 | 4/1994 |
| JP | 2007-97068 | 4/2007 |

*Primary Examiner* — Abbas H Alagheband
(74) *Attorney, Agent, or Firm* — Fujitsu Patent Center

(57) ABSTRACT

An optical transmission apparatus includes the optical transceiver configured to generate a test light for each wavelength assignable to the wavelength multiplex light to transmit the test light to the optical transmission line via the wavelength multiplexer and demultiplexer, detect a reflected light for the test light from the optical transmission line, calculate an arrival distance of the test light for the each wavelength from the reflected light for the each wavelength, and set a wavelength having a longest arrival distance among the arrival distances for the respective wavelengths, as a wavelength to be assigned to the signal light in the optical transceiver.

9 Claims, 14 Drawing Sheets

(56) References Cited

U.S. PATENT DOCUMENTS

| | | | |
|---|---|---|---|
| 2012/0045205 A1* | 2/2012 | Perron | H04B 10/0795 398/48 |
| 2012/0243863 A1* | 9/2012 | Zhao | H04B 10/071 398/16 |
| 2013/0021598 A1* | 1/2013 | Komamaki | G01M 11/3145 356/73.1 |
| 2013/0223838 A1* | 8/2013 | Horishita | H04B 10/071 398/13 |
| 2014/0085626 A1* | 3/2014 | Wei | G01M 11/31 356/73.1 |
| 2018/0191434 A1* | 7/2018 | Champavere | H04J 14/0227 |
| 2019/0393955 A1* | 12/2019 | Champavere | H04B 10/071 |

* cited by examiner

FIG. 6

| WAVELENGTH (nm) | ARRIVAL DISTANCE (km) |
|---|---|
| 1538.19 | 0.2 |
| ⋮ | ⋮ |
| 1544.13 | 0.2 |
| 1544.53 | 85.6 |
| 1544.92 | 0.2 |
| ⋮ | ⋮ |
| 1566.72 | 0.2 |

| WAVELENGTH (nm) | IN-USE FLAG | ARRIVAL DISTANCE (km) |
|---|---|---|
| 1538.19 | NO | 0.2 |
| ⋮ | | ⋮ |
| 1544.13 | YES | NO MEASUREMENT |
| 1544.53 | NO | 85.6 |
| 1544.92 | NO | 0.2 |
| ⋮ | | ⋮ |
| 1566.72 | YES | NO MEASUREMENT |

OPTICAL TRANSMISSION APPARATUS, METHOD FOR SETTING WAVELENGTH, AND OPTICAL TRANSCEIVER

CROSS-REFERENCE TO RELATED APPLICATION

This application is based upon and claims the benefit of priority of the prior Japanese Patent Application No. 2018-235924, filed on Dec. 17, 2018, the entire contents of which are incorporated herein by reference.

FIELD

The embodiments discussed herein are related to an optical transmission apparatus, a method for setting a wavelength, and an optical transceiver.

BACKGROUND

For example, as data centers and mobile devices are spread, traffic in networks continues to increase, and importance of transmission networks of a wavelength division multiplex (WDM) light to be used as infrastructure for information transmission has been increasing.

In an optical transmission apparatus of related art for transmitting a WDM light, a fixed type filter element such as an arrayed waveguide granting (AWG) is known as a wavelength multiplexer and demultiplexer for multiplexing and demultiplexing signal lights having different wavelengths. The AWG multiplexes each signal light having each wavelength from different optical transceivers, and outputs the WDM light after multiplexing to an optical fiber. The AWG demultiplexes a WDM light received from an optical fiber into each signal light having each wavelength, and outputs the signal light having each wavelength after demultiplexing to the optical transceiver corresponding to the wavelength.

Related art is disclosed in, for example, Japanese Laid-open Patent Publication Nos. 2007-97068 and 6-117961.

SUMMARY

According to an aspect of the embodiments, 1. an optical transmission apparatus includes a plurality of optical transceivers, and a wavelength multiplexer and demultiplexer configured to multiplex lights output from the respective plurality of optical transceivers, output a multiplexed light to an optical transmission line, receive a wavelength multiplex light from the optical transmission line, demultiplex the received wavelength multiplex light, and output the demultiplexed lights to the respective plurality of optical transceivers, wherein the optical transceiver is configured to generate a test light for each wavelength assignable to the wavelength multiplex light to transmit the test light to the optical transmission line via the wavelength multiplexer and demultiplexer, detect a reflected light for the test light from the optical transmission line, calculate an arrival distance of the test light for the each wavelength from the reflected light for the each wavelength, and set a wavelength having a longest arrival distance among the arrival distances for the respective wavelengths, as a wavelength to be assigned to the signal light in the optical transceiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of an arrival distance table;

FIG. 13 is an explanatory diagram illustrating an example of an arrival distance table.

DESCRIPTION OF EMBODIMENTS

In an optical transmission apparatus, when an optical transceiver is physically coupled to a connector that allows transmission of a wavelength of a signal light in an optical transceiver among a plurality of connectors of an AWG, a signal wavelength that may be transmitted is limited by the connector coupled to the optical transceiver. Therefore, in the optical transmission apparatus, it is required to ensure matching between an assigned wavelength of a signal light to be used for transmission and reception of an optical transceiver and a transmission wavelength of the connector of the AWG coupled to the optical transceiver. Therefore, in an optical transmission apparatus of related art, the matching between the assigned wavelength of the signal light in the optical transceiver and the transmission wavelength of the connector of the AWG coupled to the optical transceiver is manually confirmed by an operator or the like. In other words, for example, in the optical transmission apparatus, since a wavelength to be assigned to the signal light in the optical transceiver coupled to the connector is set according to the transmission wavelength of the connector of the AWG in the confirmation work by the operator, a work burden on the operator is large.

In view of the above, it is desirable to provide an optical transmission apparatus or the like capable of setting a wavelength to be assigned to a signal light in an optical transceiver.

Hereinafter, embodiments of an optical transmission apparatus, a method for setting a wavelength, and an optical transceiver according to the present disclosure will be described in detail with reference to the accompanying drawings. It is noted that the each embodiment does not limit the disclosed technology. The each embodiment to be described below may be combined with each other as appropriate when there is no contradiction.

First Embodiment

Figure 1:
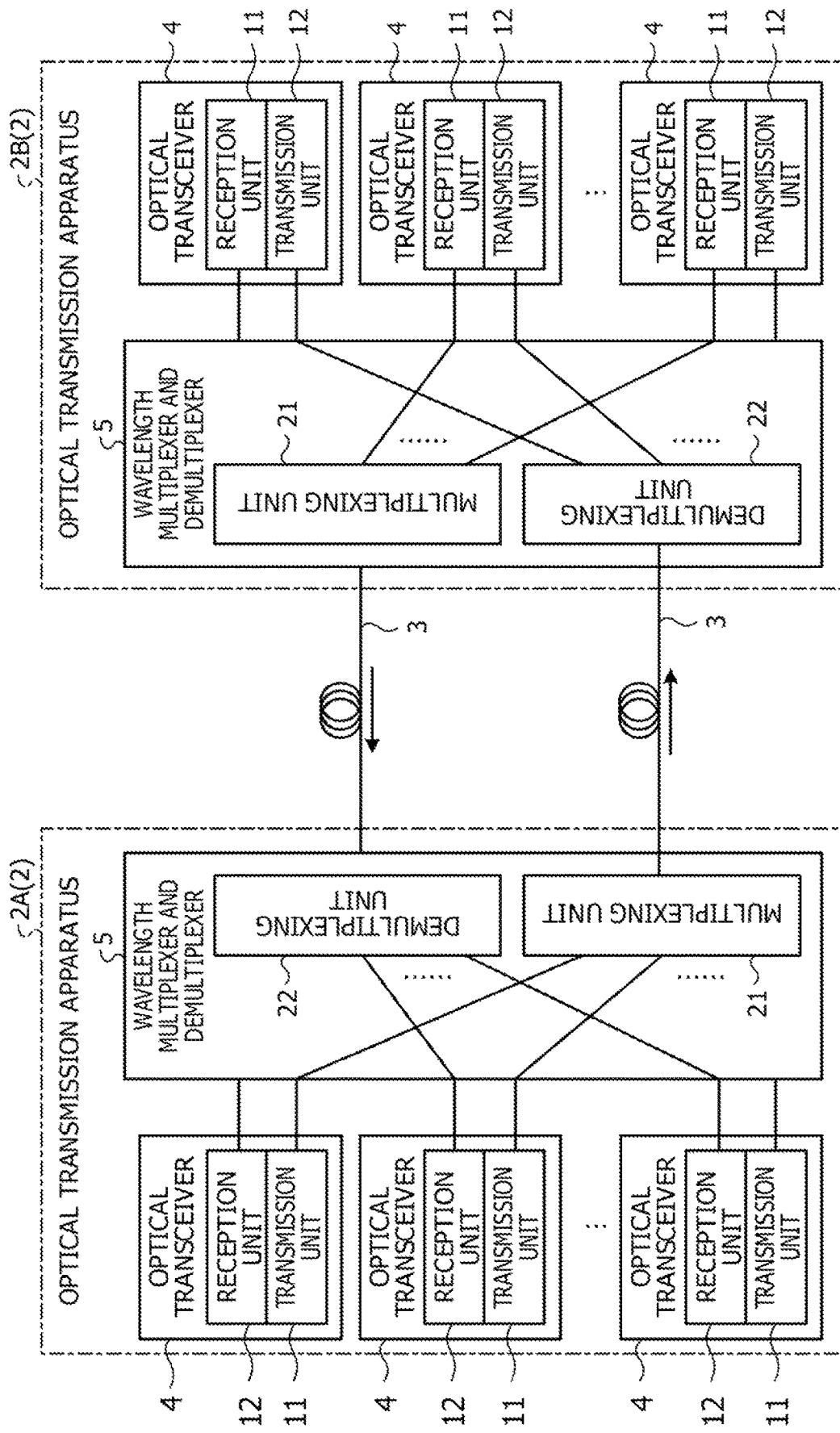
FIG. 1 is an explanatory diagram illustrating an example of a WDM system according to a first embodiment.

FIG. 1 is an explanatory diagram illustrating an example of a WDM system 1 of a first embodiment. The wavelength division multiplex (WDM) system 1 illustrated in FIG. 1 includes an optical transmission apparatus 2 (2A), an optical transmission apparatus 2 (2B) at the opposite side, and an optical fiber 3 between the optical transmission apparatus 2A and the optical transmission apparatus 2B at the opposite side. The optical fiber 3 transmits a WDM light between the optical transmission apparatus 2A and the optical transmission apparatus 2B at the opposite side.

The optical transmission apparatus 2 includes a plurality of optical transceivers 4 for transmitting and receiving a signal light having an assigned wavelength, and a wavelength multiplexer and demultiplexer 5 for multiplexing and demultiplexing a signal light in each optical transceiver 4. The optical transceiver 4 includes a transmission unit 11 and a reception unit 12. The transmission unit 11 transmits a signal light having an assigned wavelength to the wavelength multiplexer and demultiplexer 5. The reception unit 12 receives a signal light having an assigned wavelength from the wavelength multiplexer and demultiplexer 5. The wavelength multiplexer and demultiplexer 5 includes a multiplexing unit 21 and a demultiplexing unit 22. The multiplexing unit 21 multiplexes signal lights having different wavelengths from the respective optical transceivers 4 and outputs the WDM light after multiplexing to the optical fiber 3. The demultiplexing unit 22 demultiplexes the WDM light from the optical fiber 3 into signal lights having different wavelengths, and outputs the signal lights, after demultiplexing, having the different wavelengths to the optical transceivers 4 having the corresponding wavelengths. Since the optical transmission apparatus 2B at the opposite side has the same configuration as the optical transmission apparatus 2A, the same reference signs are given to the same components as those of the optical transmission apparatus 2A, and redundant descriptions of the components and operations will be omitted.

Figure 2:
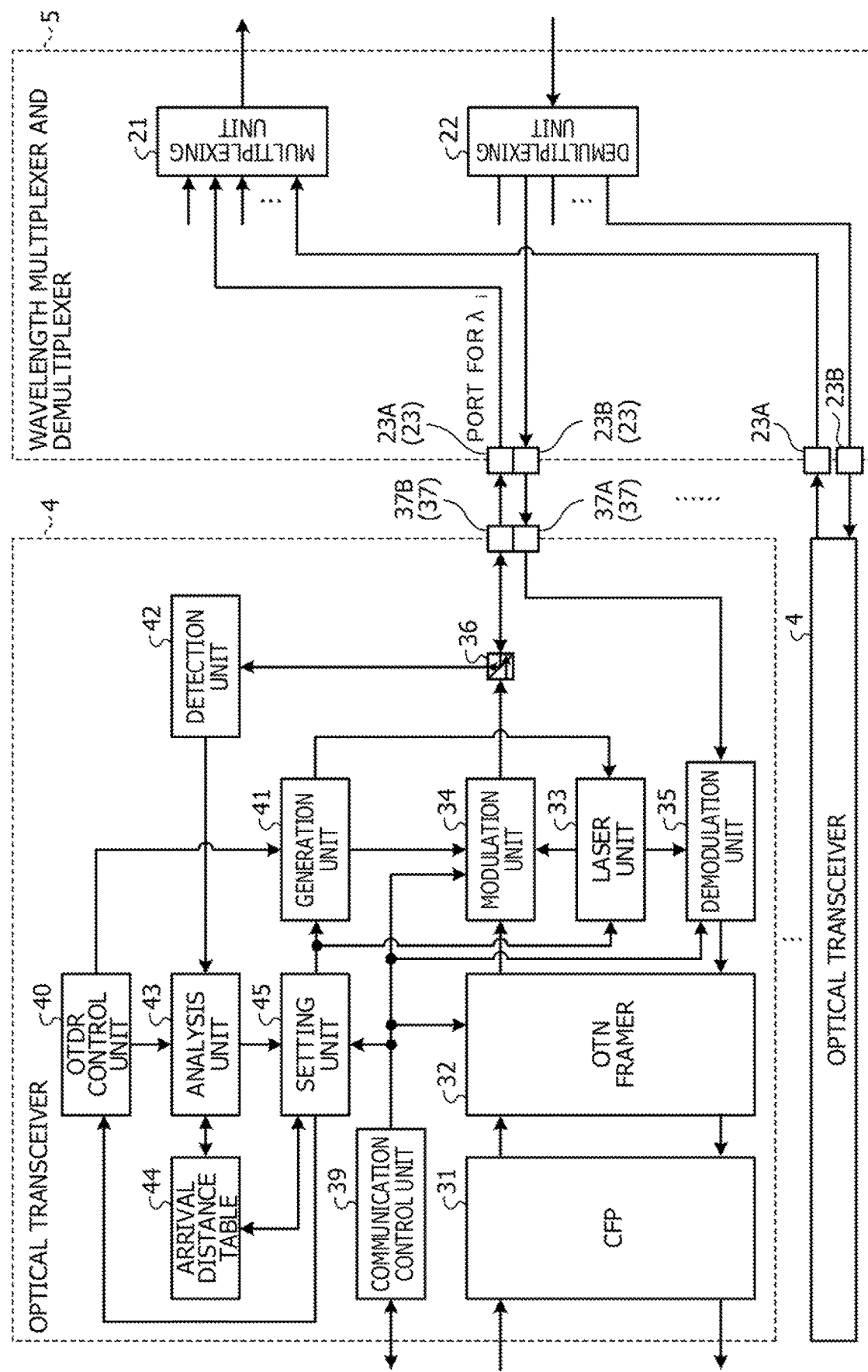
FIG. 2 is an explanatory diagram illustrating an example of an optical transmission apparatus.

FIG. 2 is an explanatory diagram illustrating an example of the optical transmission apparatus 2. The wavelength multiplexer and demultiplexer 5 includes a plurality of input connectors 23A (23) and a plurality of output connectors 23B (23). The input connectors 23A couple the plurality of optical transceivers 4 to the multiplexing unit 21, and input signal lights from the optical transceivers 4 to the multiplexing unit 21. The output connectors 23B couple the plurality of optical transceivers 4 to the demultiplexing unit 22, and output signal lights from the demultiplexing unit 22 to the optical transceivers 4. A transmission wavelength of the input connector 23A is matched with an assigned wavelength of the signal light in the optical transceiver 4 coupled to the input connector 23A. A transmission wavelength of the output connector 23B is also matched with an assigned wavelength of the signal light in the optical transceiver 4 coupled to the output connector 23B.

The optical transceiver 4 in the optical transmission apparatus 2 includes a C-form-factor pluggable (CFP) 31, an optical transport network (OTN) framer 32, a laser unit 33, a modulation unit 34, and a demodulation unit 35. The optical transceiver 4 further includes an optical circulator 36, an input connector 37A (37), and an output connector 37B (37). The optical transceiver 4 includes a communication control unit 39, an optical time domain reflectometer (OTDR) control unit 40, a generation unit 41, a detection unit 42, an analysis unit 43, an arrival distance table 44, and a setting unit 45.

The OTN framer 32 is implemented by, for example, a circuit such as a field-programmable gate array (FPGA).

The laser unit 33 is implemented by, for example, a laser diode or the like.

The modulation unit 34 is an optical modulator, and is implemented by, for example, an LN modulator.

The demodulation unit 35 is an optical demodulator, and includes, for example, a 90° optical hybrid circuit.

The communication control unit 39, the optical time domain reflectometer (OTDR) control unit 40, the generation unit 41, the analysis unit 43, and the setting unit 45 are implemented by, for example, a circuit such as a processor or the like.

The detection unit 42 includes, for example, a photodiode or the like.

The arrival distance table 44 includes, for example, a memory or the like.

The CFP 31 is a communication interface for transmitting and receiving a signal having a transmission bit rate of 100 Gbps, for example. The OTN framer 32 is a frame processing unit that assembles an electric signal into an OTN frame and disassembles an OTN frame into an electric signal. The laser unit 33 oscillates a laser beam. The modulation unit 34 modulates the OTN frame by the laser beam, and outputs the modulated signal light to the output connector 37B via the optical circulator 36. The demodulation unit 35 demodulates a signal light from the input connector 37A by the laser beam, and outputs an OTN frame after the demodulation to the OTN framer 32. The output connector 37B couples the optical circulator 36 to the input connector 23A in the wavelength multiplexer and demultiplexer 5, and outputs the signal light from the optical circulator 36 to the wavelength multiplexer and demultiplexer 5. The input connector 37A couples the output connector 23B in the wavelength multiplexer and demultiplexer 5 to the demodulation unit 35, and inputs the signal light from the wavelength multiplexer and demultiplexer 5 to the demodulation unit 35. The optical circulator 36 outputs the signal light from the modulation unit 34 to the output connector 37B and outputs the reflected light for the pulse light from the output connector 37B to the detection unit 42. The CFP 31, the OTN framer 32, the laser unit 33, the modulation unit 34, and the demodulation unit 35 correspond to, for example, the transmission unit 11 and the reception unit 12.

The communication control unit 39 controls the entire optical transceiver 4. The OTDR control unit 40 controls an OTDR for measuring the reflected light for the pulse light by using the pulse light which is a test light for each wavelength. The OTDR control unit 40 inputs the pulse light to the optical fiber 3, and detects transmission characteristics, disconnection or the like of the optical fiber 3 depending on magnitude of the scattered light and the reflected light returning for the pulse light.

The generation unit 41 generates parameters of the pulse light, from the OTDR control unit 40, for each wavelength assignable to a WDM light, and sets the parameters of the pulse light in the laser unit 33 and the modulation unit 34. The parameters of the pulse light correspond to, for example, a pulse light wavelength, a pulse interval, a pulse width, and the like. The laser unit 33 generates the pulse light for each wavelength based on the parameters of the pulse light for each wavelength from the generation unit 41. The modulation unit 34 modulates the pulse light generated by the laser unit 33, and outputs the modulated pulse light to the output connector 37B through the optical circulator 36. The detection unit 42 detects a reflected light for the pulse light from the input connector 37A. The reflected light is, for example, a near end reflected light for the pulse light, a backscattered light for the pulse light, an end surface reflected light for the pulse light, or the like.

The analysis unit 43 analyzes the reflected light for each pulse light detected by the detection unit 42. The analysis unit 43 calculates an arrival distance of the pulse light for each wavelength based on the reflected light for the pulse light for each wavelength. The analysis unit 43 calculates the arrival distance of the pulse light, based on a level of the reflected light for the pulse light and time from emission of the pulse light to reception of the reflected light, by using the maximum arrival distance and arrival time of the signal light according to specifications of the optical transceiver 4. The analysis unit 43 stores the arrival distance of the pulse light for each wavelength in the arrival distance table 44. The setting unit 45 refers to the arrival distance table 44, and sets the wavelength having the longest arrival distance among the arrival distances of the pulse lights for the respective wavelengths as the assigned wavelength of the optical transceiver 4.

The wavelength multiplexer and demultiplexer 5 is, for example, an arrayed waveguide granting (AWG). The multiplexing unit 21 includes a plurality of input connectors 23A having different transmission wavelengths, multiplexes signal lights having different wavelengths of the respective optical transceivers 4 from the respective input connectors 23A, and outputs a WDM light after multiplexing to the optical fiber 3. The demultiplexing unit 22 includes a plurality of output connectors 23B having different transmission wavelengths, demultiplexes a WDM light from the optical fiber 3, and outputs signal lights having different wavelengths after demultiplexing to the respective optical transceivers 4 through the output connectors 23B.

Figure 3:
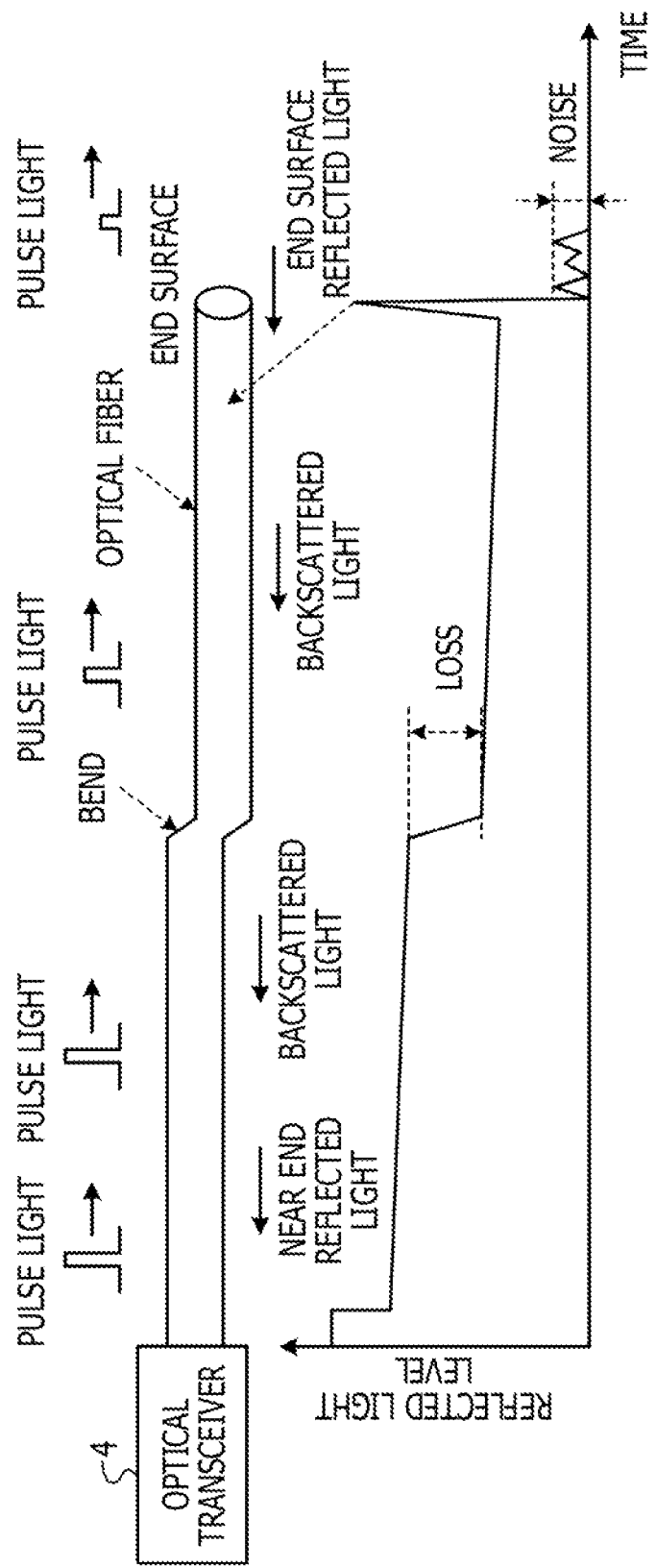
FIG. 3 is an explanatory diagram illustrating an example of a relationship between a pulse light and a reflected light in the optical transmission apparatus.

FIG. 3 is an explanatory diagram illustrating an example of a relationship between a pulse light and a reflected light in the optical transmission apparatus 2. When the optical transmission apparatus 2A and the optical transmission apparatus 2B at the opposite side are coupled to each other via the optical fiber 3, an operator couples the optical transceiver 4 to the connector 23 of the wavelength multiplexer and demultiplexer 5 so as to ensure the matching between the assigned wavelength of the optical transceiver 4 and the transmission wavelength of the connector 23 of the wavelength multiplexer and demultiplexer 5.

In this embodiment, attention is paid to a property being incapable of measuring the characteristics immediately adjacent to the OTDR due to near end reflection from the inside of the near-end optical transceiver 4. Furthermore, in this embodiment, attention is also paid to a property being incapable of measuring the characteristics at a distance farther from a distance at which a reflected light level becomes lower than the noise level In the long-distance optical fiber 3, and a property being incapable of transmitting a light having a wavelength other than the transmission wavelength of the connector 23 in the wavelength multiplexer and demultiplexer 5. In the optical transceiver 4, an OTDR function that is a pulse light wavelength variable type is incorporated, an arrival distance of the pulse light for each wavelength assignable to a WDM light is calculated, and the arrival distance of each wavelength is tabulated. The optical transceiver 4 searches for the wavelength of the signal light passing through the connector 23 of the wavelength multiplexer and demultiplexer 5, based on the arrival distance of the pulse light for each wavelength. The optical transceiver 4 sets the assigned wavelength of the signal light to the searched wavelength.

The generation unit 41 in the optical transceiver 4 sets parameters in the laser unit 33 and the modulation unit 34 to generate pulse lights having different wavelengths. The modulation unit 34 modulates the pulse light having a predetermined wavelength from the laser unit 33, and outputs the modulated pulse light to the optical fiber 3 via the wavelength multiplexer and demultiplexer 5.

The detection unit 42 in the optical transceiver 4 detects a reflected light, for example, such as a near end reflected light, a backscattered light, or an end surface reflected light, which is generated when the pulse light is transmitted from the inside of the optical transceiver 4 through the optical fiber 3. The near end reflected light is, for example, the reflected light for the pulse light generated inside the optical transceiver 4. The backscattered light is a scattered light for the pulse light passing through the optical fiber 3. The end surface reflected light is, for example, a reflected light for the pulse light generated at a point where the fiber is joined at the connector 23 or the connector 37 over the optical fiber 3. Also at the optical connector 37 of the optical transceiver 4 in the optical transmission apparatus 2B at the opposite side, the end surface reflected light is generated.

Although the reflected light level illustrated in FIG. 3 temporarily rises due to the near end reflection for the pulse light when the pulse light passes through the inside of the near-end optical transceiver 4, the reflected light level gradually attenuates as the pulse light passes through the optical fiber 3. Although the reflected light level attenuates at a point where the optical fiber 3 is bent, and the pulse light level gradually decreases as the pulse light passes through the optical fiber 3, the reflected light level significantly increases due to the end surface reflection generated when the pulse light is received by the optical transceiver 4 in the optical transmission apparatus 2B at the opposite side. Thereafter, the reflected light level significantly increases due to the end surface reflection, and then falls to a level equal to or lower than the noise level.

Figure 4:
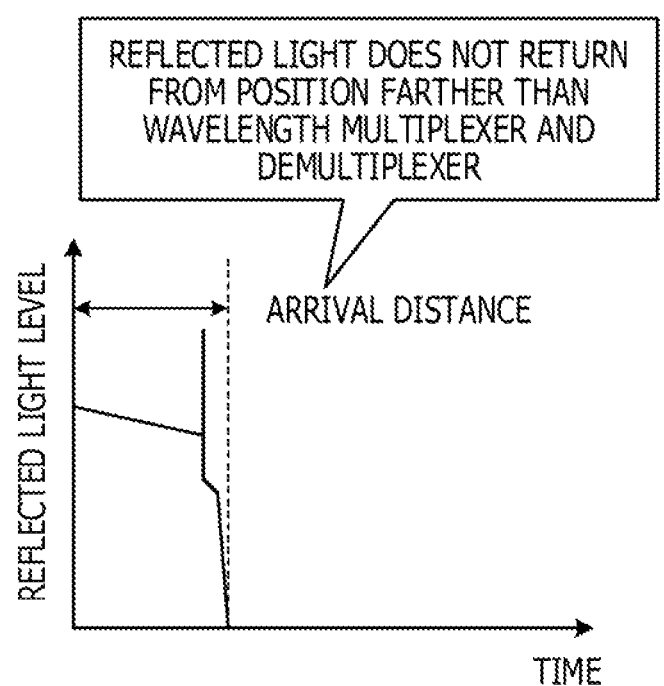
FIG. 4 is an explanatory diagram illustrating an example of a reflected light level when a transmission wavelength of an input connector of a wavelength multiplexer and demultiplexer is different from an assigned wavelength of a pulse light from an optical transceiver coupled to the input connector.

FIG. 4 is an explanatory diagram illustrating an example of the reflected light level when the transmission wavelength of the input connector 23A of the wavelength multiplexer and demultiplexer 5 is different from the assigned wavelength of the pulse light from the optical transceiver 4 coupled to the input connector 23A. Although the reflected light level illustrated in FIG. 4 increases in response to the end surface reflection for the pulse light from the input connector 23A of the near-end wavelength multiplexer and demultiplexer 5, the reflected light level for the pulse light beyond the wavelength multiplexer and demultiplexer 5 is remarkably reduced. That is, since the assigned wavelength of the optical transceiver 4 is different from the transmission wavelength of the input connector 23A of the wavelength multiplexer and demultiplexer 5 coupled to the optical transceiver 4, the pulse light is not transmitted through the wavelength multiplexer and demultiplexer 5 and the reflected light for the pulse light beyond the wavelength multiplexer and demultiplexer 5 is not returned.

Figure 5:
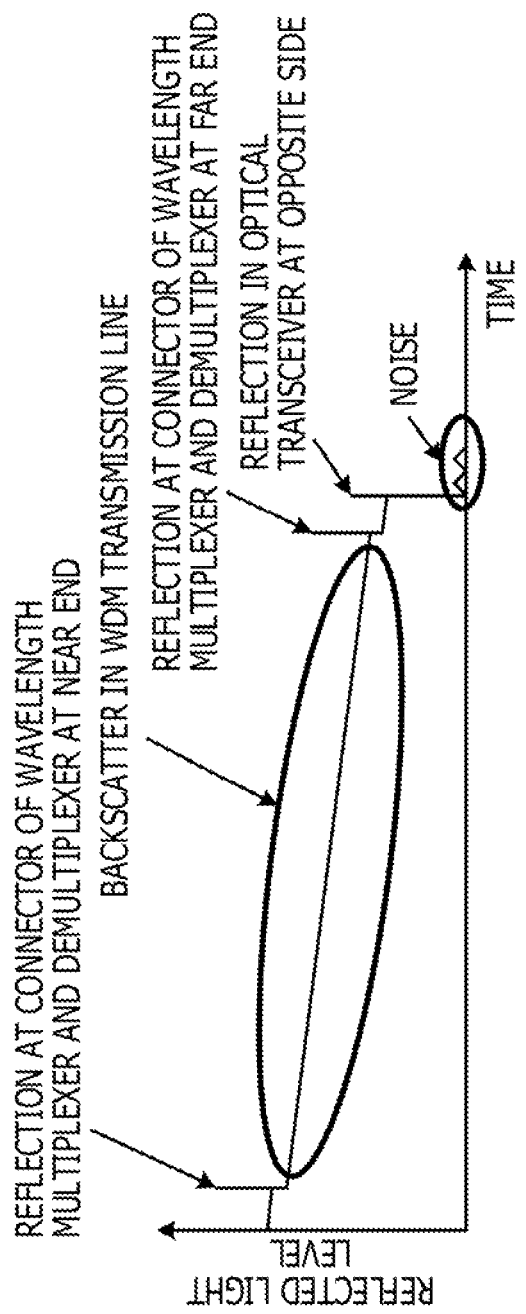
FIG. 5 is an explanatory diagram illustrating an example of a reflected light level when a transmission wavelength of an input connector of a wavelength multiplexer and demultiplexer and an assigned wavelength of a pulse light from an optical transceiver coupled to the input connector are identical to each other.

FIG. 5 is an explanatory diagram illustrating an example of the reflected light level when the transmission wavelength of the input connector 23A of the wavelength multiplexer and demultiplexer 5 and the assigned wavelength of the pulse light from the optical transceiver 4 connected to the input connector 23A are identical to each other. The level of the reflected light illustrated in FIG. 5 increases in response to the end surface reflection for the pulse light from the input connector 23A of the near-end wavelength multiplexer and demultiplexer 5. The reflected light level gradually decreases in response to the backscattering of the pulse light passing through the optical fiber 3 beyond the wavelength multiplexer and demultiplexer 5. The reflected light level increases in response to far end reflection for the pulse light from the input connector 23A of the wavelength multiplexer and demultiplexer 5 in the optical transmission apparatus 2B at the opposite side. The reflected light level rises in response to the end surface reflection for the pulse light received by the optical transceiver 4 in the optical transmission apparatus 2B at the opposite side, and the reflected light level decreases to a level equal to or lower than the noise level after the rise.

FIG. 6 is an explanatory diagram illustrating an example of the arrival distance table 44. The arrival distance table 44 illustrated in FIG. 6 manages the arrival distance of the pulse light for each wavelength assignable to the WDM light. Based on the reflected light for the pulse light detected by the detection unit 42, the analysis unit 43 determines a point at which the level of the reflected light detected by the detection unit 42 is equal to or lower than the noise level for each wavelength of the pulse light as the arrival distance of the wavelength, and sequentially calculates the arrival distance of the pulse light. The analysis unit 43 stores the arrival distance of the pulse light calculated for each wavelength in the arrival distance table 44. The setting unit 45 refers to the arrival distance table 44, and sets the wavelength of the longest arrival distance as the assigned wavelength of the optical transceiver 4. In a case of the arrival distance table 44 illustrated in FIG. 6, the setting unit 45 sets 1544.53 nm which is a wavelength corresponding to 86.6 km whose arrival distance is the longest distance, as the assigned wavelength of the optical transceiver 4.

Figure 7:
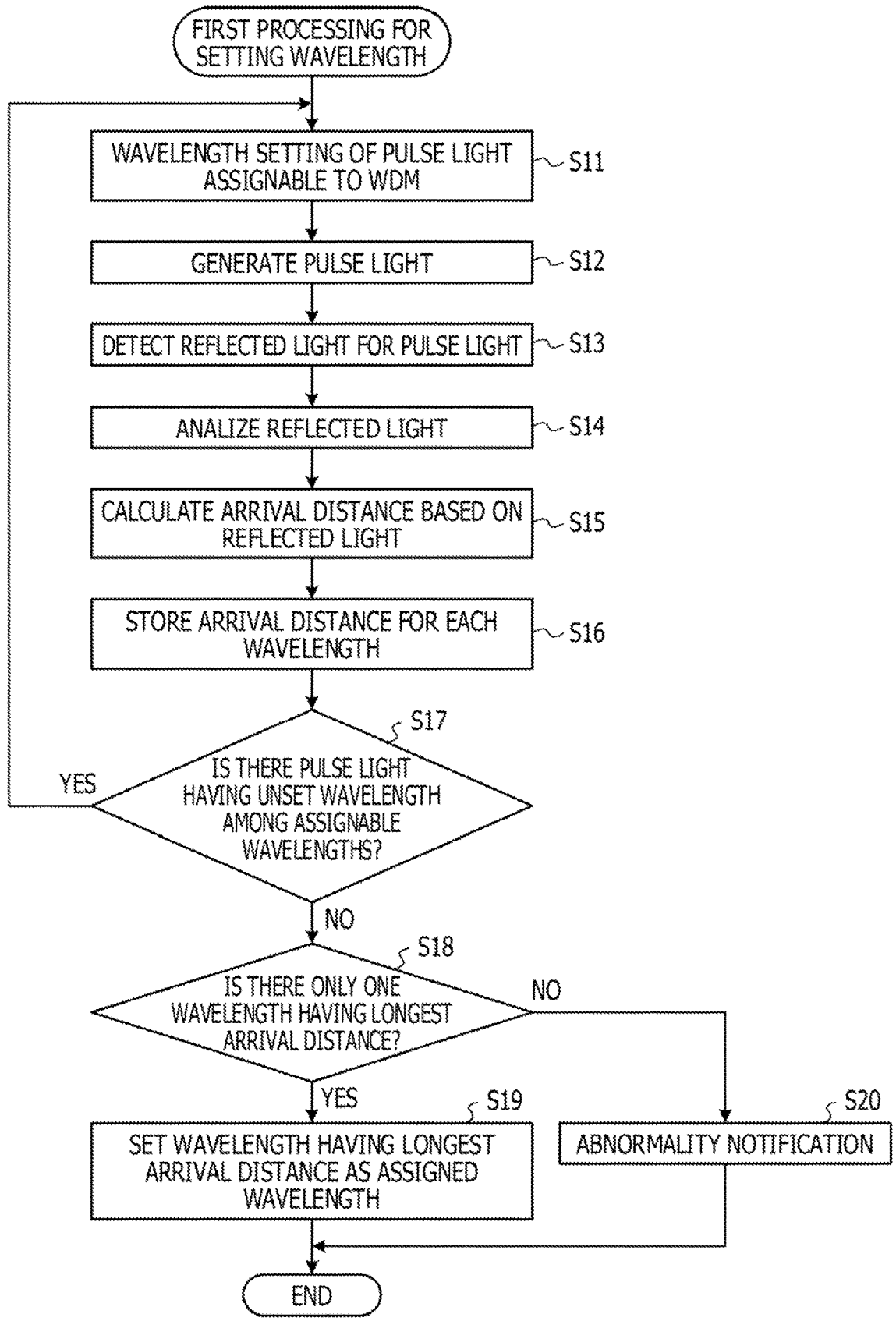
FIG. 7 is a flowchart illustrating an example of a processing operation of an optical transceiver related to a first processing for setting a wavelength.

FIG. 7 is a flowchart illustrating an example of the processing operation of the optical transceiver 4 related to a first processing for setting a wavelength. In FIG. 7, the OTDR control unit 40 in the optical transceiver 4 sets a wavelength of pulse light assignable to a WDM light in the optical transceiver 4 (step S11). The generation unit 41 in the optical transceiver 4 generates the pulse light having the set wavelength, and outputs the generated pulse light to the optical fiber 3 via the wavelength multiplexer and demultiplexer 5 (step S12). The detection unit 42 in the optical transceiver 4 detects the reflected light for the pulse light from the wavelength multiplexer and demultiplexer 5 (step S13). The reflected light is a reflected light, for example, such as an end surface reflected light or a backscattered light.

The analysis unit 43 in the optical transceiver 4 analyzes the reflected light detected by the detection unit 42 (step S14). Based on the reflected light for the pulse light, the analysis unit 43 calculates the arrival distance of the pulse light for each wavelength of the pulse lights (step S15). The analysis unit 43 stores the arrival distance of the pulse light for each wavelength in the arrival distance table 44 (step S16). The OTDR control unit 40 determines whether or not there is a pulse light having an unset wavelength among wavelengths assignable to the WDM light in the optical transceiver 4 (step S17). When there is a pulse light having an unset wavelength (Yes in step S17), the setting unit 45 in the optical transceiver 4 moves to step S11 to set the pulse light having the unset wavelength.

When there is no pulse light having an unset wavelength (No in step S17), the setting unit 45 refers to the arrival distance table 44 and determines whether or not there is only one wavelength having the longest arrival distance (step S18). When there is only one wavelength having the longest arrival distance (Yes in step S18), the setting unit 45 sets the wavelength having the longest arrival distance as the assigned wavelength of the optical transceiver 4 (step S19), and ends the processing operation illustrated in FIG. 7.

When there is not only one wavelength having the longest arrival distance (No in step S18), the setting unit 45 notifies a terminal device of the operator (not illustrated) of abnormality notification (step S20), and ends the processing operation illustrated in FIG. 7.

In the optical transceiver 4 in the WDM system 1 according to the first embodiment, the pulse light having each wavelength assignable to the WDM light is generated, and the pulse light is transmitted to the optical fiber 3 via the wavelength multiplexer and demultiplexer 5 to detect the reflected light for the pulse light from the optical fiber 3. The optical transceiver 4 calculates the arrival distance of the pulse light for each wavelength from the reflected light for each wavelength, and sets the wavelength having the longest arrival distance among the arrival distances for the respective wavelengths, as the wavelength to be assigned to the optical transceiver 4. As a result, it is not required to provide a special function to the wavelength multiplexer and demultiplexer 5, and the wavelength to be assigned to the signal light in the optical transceiver 4 coupled to the connector 23 of the wavelength multiplexer and demultiplexer 5 may be automatically set. The work burden of the operator, as in related art, for ensuring the matching between the transmission wavelength of the input connector 23A of the wavelength multiplexer and demultiplexer 5 and the assigned wavelength of the signal light in the optical transceiver 4 coupled to the input connector 23A of the wavelength multiplexer and demultiplexer 5 may be reduced.

Moreover, the optical transceiver 4 transmits the pulse light for each wavelength through the same path as the optical fiber 3 for transmitting the signal light, and calculates the arrival distance for each wavelength assignable to the WDM light, based on the reflected light for the pulse light in the same path. The optical transceiver 4 sets the wavelength of the longest arrival distance among the arrival distances of the pulse lights for respective wavelengths as the assigned wavelength of the signal light. As a result, the optical transceiver 4 may automatically set the wavelength to be assigned to the signal light according to the current coupling state by using the reflected light for the pulse light in the same path as that of the signal light.

In the optical transceiver 4, when there is not only one wavelength having the longest arrival distance, the coupling between the input connector 23A of the wavelength multiplexer and demultiplexer 5 and the optical transceiver 4 is determined to be incorrect, and an abnormality is notified. As a result, the operator may recognize an error of the coupling based on the abnormality notification.

In the method of related art, an optical spectrum analyzer is coupled to a monitor port in the wavelength multiplexer and demultiplexer 5 in order to confirm that the coupling between the optical transceiver 4 and the wavelength multiplexer and demultiplexer 5 and the wavelength setting for the optical transceiver 4 are correct. It is required to confirm that a spectrum as designed is observed by the optical spectrum analyzer. In contrast, in this embodiment, in order to ensure the coupling between the optical transceiver 4 and the wavelength multiplexer and demultiplexer 5 and the matching between the assigned wavelength of the signal light in the optical transceiver 4 and the transmission wavelength of the connector of the wavelength multiplexer and demultiplexer 5, the wavelength having the longest arrival distance of the pulse light is automatically set as the assigned wavelength of the optical transceiver 4. As a result, the work burden of the operator may be reduced without using an optical spectrum analyzer. Therefore, it is easier to confirm whether or not the coupling is carried out as designed, as compared with the method of related art.

In the optical transceiver 4, the generation of the signal light and the pulse light may be shared by the laser unit 33 and the modulation unit 34, so that it is possible to reduce a component cost.

In the optical transceiver 4 according to the first embodiment, a case is exemplified in which the detection unit 42 detects the reflected light for the pulse light. However, the demodulation unit 35 may also have a function of the detection unit 42, and this embodiment will be described below as a second embodiment.

Second Embodiment

Figure 8:
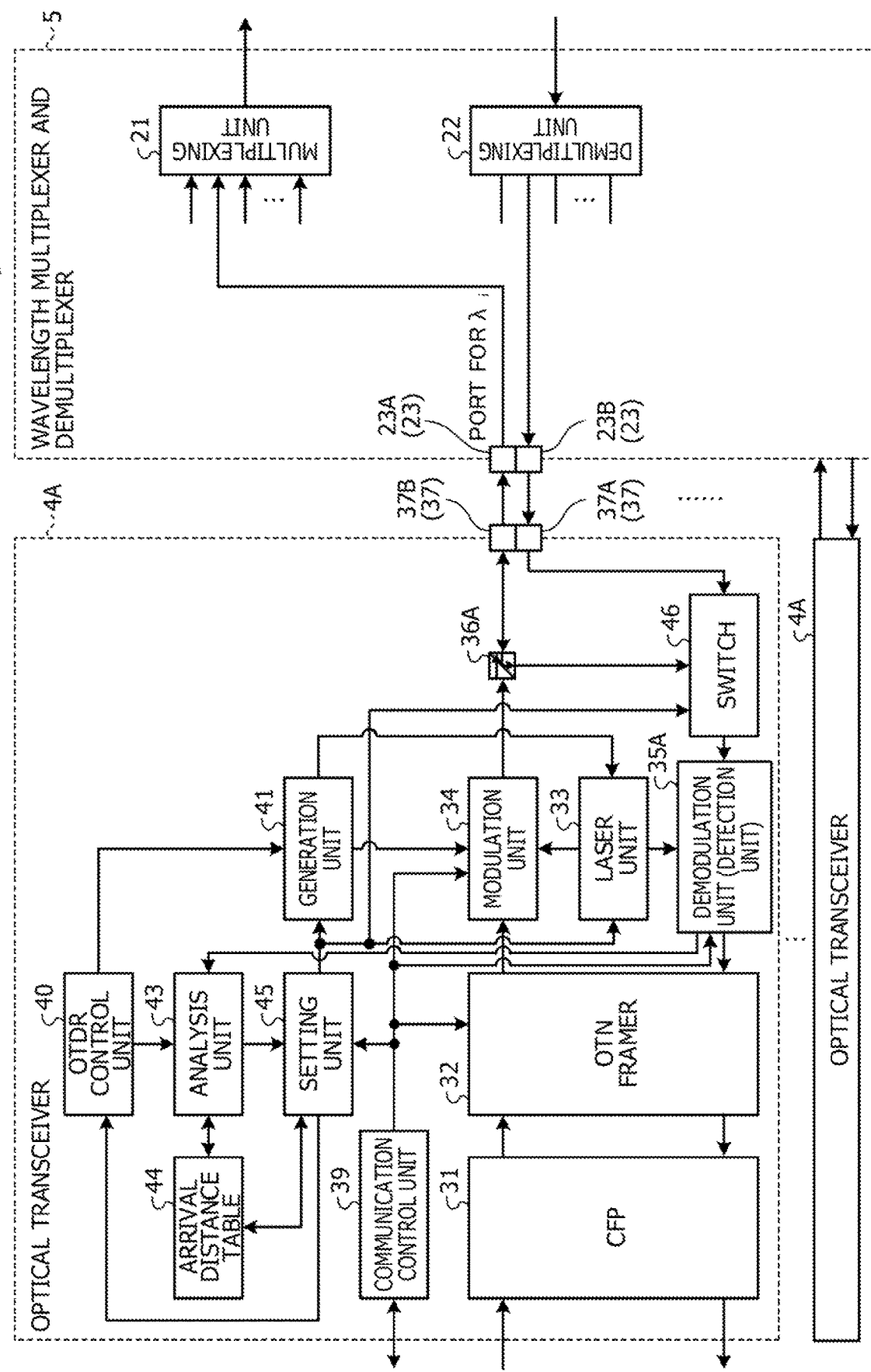
FIG. 8 is an explanatory diagram illustrating an example of an optical transmission apparatus according to a second embodiment.

FIG. 8 is an explanatory diagram illustrating an example of the optical transmission apparatus 2A according to the second embodiment. The same constituent elements as those of the optical transmission apparatus 2A according to the first embodiment are given the same reference signs, and redundant descriptions of the constituent elements and operations thereof will be omitted.

An optical transceiver 4A according to the second embodiment illustrated in FIG. 8 differs from the optical transceiver 4 according to the first embodiment in that the demodulation unit 35A also has a function of the detection unit 42. The optical transceiver 4A includes a switch 46 disposed between a demodulation unit 35A and an input connector 37A, and an optical circulator 36A. The optical circulator 36A outputs a pulse light from the modulation unit 34 to an output connector 37B, and outputs a reflected light for a pulse light from the output connector 37B to the switch 46. The switch 46 switches an output to the demodulation unit 35A to one of the pulse light from the optical circulator 36A through the output connector 37B and the signal light from the input connector 37A. The demodulation unit 35A demodulates the reflected light from the optical circulator 36A by switching coupling of the switch 46, and outputs the reflected light after the demodulation to the analysis unit 43.

The analysis unit 43 calculates an arrival distance of the pulse light based on a detection result of the reflected light for the pulse light, and stores the arrival distance of the pulse light for each wavelength in the arrival distance table 44. The setting unit 45 sets the wavelength of the pulse light having the longest arrival distance as the assigned wavelength of the optical transceiver 4 based on the arrival distance of the pulse light for each wavelength.

In the optical transceiver 4A in the WDM system 1 according to the second embodiment, the pulse light for each wavelength assignable to a WM light is generated, the pulse light is transmitted to the optical fiber 3 via the wavelength multiplexer and demultiplexer 5, and the reflected light for the pulse light is detected from the optical fiber 3. The optical transceiver 4A calculates the arrival distance of the pulse light for each wavelength from the reflected light for each wavelength, and sets the wavelength having the longest arrival distance among the arrival distances for the respective wavelengths, as the wavelength to be assigned to the optical transceiver 4A. As a result, it is not required to provide a special function to the wavelength multiplexer and demultiplexer 5, and the wavelength to be assigned to the signal light in the optical transceiver 4A coupled to the wavelength multiplexer and demultiplexer 5 may be automatically set. Therefore, it is possible to reduce the work burden of the operator.

In the optical transceiver 4A, the generation of the signal light and the pulse light is executed by the laser unit 33 and the modulation unit 34, and the function of the detection unit 42 for detecting the reflected light is performed by the demodulation unit 35A, so that it is possible to reduce a component cost.

A case is exemplified in which the pulse light is generated by using the laser unit 33 for generating a signal light in the optical transceiver 4 according to the first embodiment, but the pulse light and the signal light may be separately generated, and this embodiment will be described below as a third embodiment.

Third Embodiment

Figure 9:
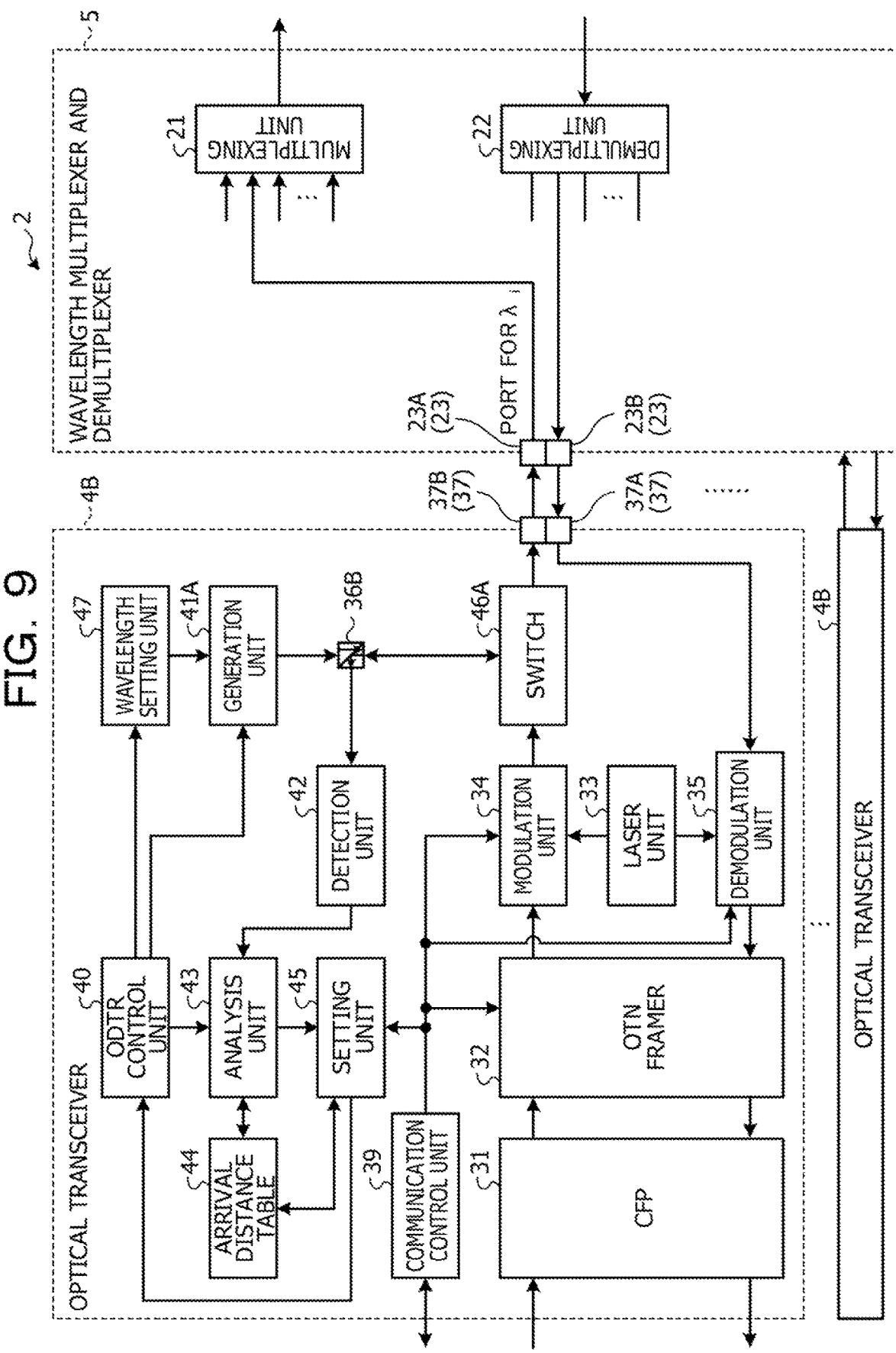
FIG. 9 is an explanatory diagram illustrating an example of an optical transmission apparatus according to a third embodiment.

FIG. 9 is an explanatory diagram illustrating an example of the optical transmission apparatus 2 according to the third embodiment. The same constituent elements as those of the optical transmission apparatus 2 according to the first embodiment are given the same reference signs, and redundant descriptions of the constituent elements and operations thereof will be omitted.

An optical transceiver 4B according to the third embodiment illustrated in FIG. 9 differs from the optical transceiver 4 according to the first embodiment in that a switch 46A, a wavelength setting unit 47, a generation unit 41A, and an optical circulator 36B are provided. The switch 46A is disposed between the modulation unit 34 and the output connector 37B. The wavelength setting unit 47 sets a wavelength of a pulse light. The generation unit 41A generates a pulse light having the wavelength set by the wavelength setting unit 47. The optical circulator 36B outputs the pulse light from the generation unit 41A to the switch 46A and outputs a reflected light from the switch 46A to the detection unit 42.

The switch 46A outputs the pulse light from the generation unit 41A to the output connector 37B and outputs a reflected light for the pulse light from the output connector 37B to the optical circulator 36A. The optical circulator 36A outputs the reflected light from the switch 46A to the detection unit 42. The detection unit 42 detects the reflected light for the pulse light, and outputs the detected reflected light to the analysis unit 43. The analysis unit 43 calculates an arrival distance of the pulse light based on an analysis result of the reflected light for the pulse light, and stores the arrival distance of the pulse light for each wavelength in the arrival distance table 44. The setting unit 45 sets the wavelength of the pulse light having the longest arrival distance as an assigned wavelength of the optical transceiver 4B based on the arrival distance of the pulse light for each wavelength.

In the optical transceiver 4B according to the third embodiment, the pulse light for each wavelength assignable to the WDM light is generated, the pulse light is transmitted to the optical fiber 3 via the wavelength multiplexer and demultiplexer 5, and the reflected light for the pulse light is detected from the optical fiber 3. The optical transceiver 4B calculates the arrival distance of the pulse light for each wavelength from the reflected light for each wavelength, and sets the wavelength having the longest arrival distance among the arrival distances for the respective wavelengths, as the wavelength to be assigned to the optical transceiver 4B. As a result, it is not required to provide a special function to the wavelength multiplexer and demultiplexer 5, and the wavelength to be assigned to the signal light in the optical transceiver 4B coupled to the wavelength multiplexer and demultiplexer 5 may be automatically set. Therefore, it is possible to reduce the work burden of the operator.

In the WDM system 1 according to the first embodiment to the third embodiment, a system without an optical amplifier for amplifying the WDM light over the optical fiber 3 between the optical transmission apparatus 2A and the optical transmission apparatus 2B at the opposite side is exemplified. On the contrary, in order to achieve long-distance transmission of the WDM light, a system such as a WDM system 1A having an optical amplifier is used over the optical fiber 3. An embodiment in a case where whether a WDM system to which the optical transceiver 4 is coupled is a WDM system without an optical amplifier or with an optical amplifier is not known will be described below as a fourth embodiment.

Fourth Embodiment

Figure 10:
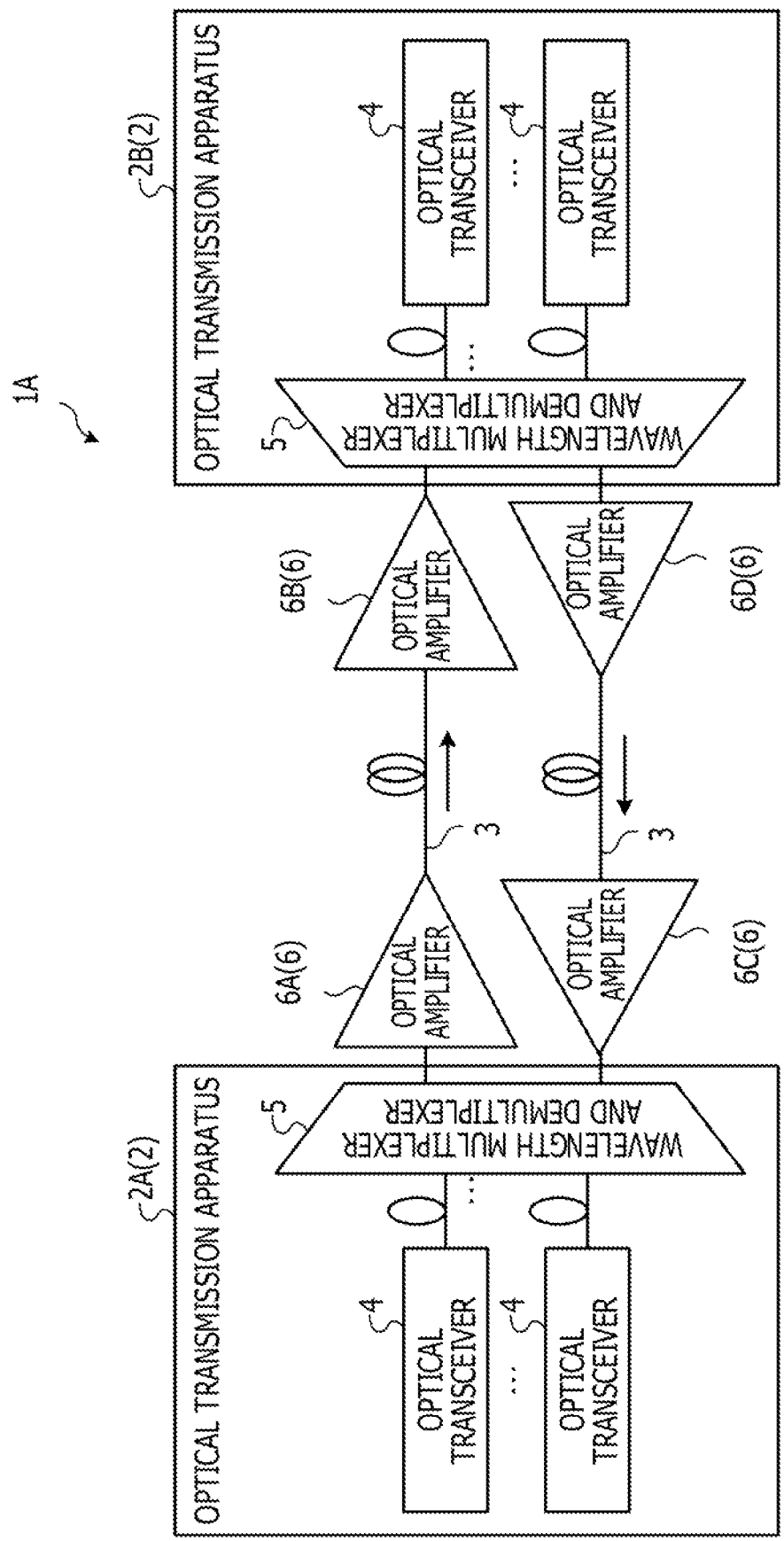
FIG. 10 is an explanatory diagram illustrating an example of a WDM system having an optical amplifier for explaining a fourth embodiment.

FIG. 10 is an explanatory diagram illustrating an example of the WDM system 1A having an optical amplifier for explaining the fourth embodiment. The WDM system 1A illustrated in FIG. 10 includes the optical transmission apparatus 2A, an optical amplifier 6A (6), the optical transmission apparatus 2B at the opposite side, an optical amplifier 6B (6) at the opposite side, and the optical fiber 3. The optical amplifier 6A and the optical amplifier 6B at the opposite side are disposed over an optical fiber 3A (3) in an uplink from the optical transmission apparatus 2A to the optical transmission apparatus 2B at the opposite side. An optical amplifier 60 at the opposite side and an optical amplifier 6C are disposed over an optical fiber 3B (3) in a downlink from the optical transmission apparatus 2B at the opposite side to the optical transmission apparatus 2A.

The optical amplifier 6A over the optical fiber 3A in the uplink optically amplifies the WDM light from the optical transmission apparatus 2A, and outputs the WDM light after the optical amplification to the optical amplifier 6B at the opposite side. The optical amplifier 6B at the opposite side optically amplifies the WDM light from the optical amplifier 6A, and outputs the WDM light after the optical amplification to the optical transmission apparatus 26 at the opposite side. The optical amplifier 6D at the opposite side over the optical fiber 36 in the downlink optically amplifies the WDM light from the optical transmission apparatus 2B at the opposite side, and outputs the WDM light after the optical amplification to the optical amplifier 6C. The optical amplifier 6C optically amplifies the WDM light from the optical amplifier 6D at the opposite side, and outputs the WDM light after the optical amplification to the optical transmission apparatus 2A. Since the optical amplifier 6 incorporates an isolator, the WDM light is optically amplified as for an input of the WDM light from an input direction, but an output of the WDM light is cut off, for an input of the WDM light from an output direction.

In the OTDR, a measurable distance is longer as power of the pulse light is larger, but in the WDM system 1A, the power of the pulse light may not be made larger than power of other signal lights used in the WDM system 1A in order to avoid influence on signal lights having other wavelengths. A measurable distance is longer as a pulse width of the pulse light is longer, but when the pulse width is long, distance resolution becomes coarse and time influenced by the near end reflection also becomes long, so that it is difficult to measure characteristics immediately adjacent to the OTDR. In order to correctly perform a long distance measurement, it is required to lengthen pulse interval of the pulse light. However, when the pulse interval is long, the measurement takes long time, so that time required for automatic setting of the wavelength also becomes long. When the following pulse light is sent before the reflected light for the pulse light returns, it becomes difficult to recognize which pulse light is reflected. As a result, there is a possibility that an arrival distance of a point where the pulse light is reflected may be erroneously determined.

When the optical amplifier 6 is not present over the optical fiber 3 between the optical transmission apparatus 2A and the optical transmission apparatus 26 at the opposite side of the WDM system 1, for the pulse light having a wavelength that is transmitted through the wavelength multiplexer and demultiplexer 5, the reflected light returns until the pulse light reaches to the optical transmission apparatus 2B at the opposite side. As a result, when the optical amplifier 6 does not exist, it is required to increase the pulse interval of the pulse light. In many cases, in a WDM system without an optical amplifier, a difference in arrival distance between a wavelength which is transmittable through the wavelength multiplexer and demultiplexer 5 and a wavelength which is not transmittable is about several kilometers or more. Therefore, in the optical transceiver 4, the distance resolution may be low, and the pulse width of the pulse light may be wide.

On the other hand, when the optical amplifier 6 is present over the optical fiber 3 between the optical transmission apparatus 2A and the optical transmission apparatus 2B at the opposite side, since an isolator is provided in the optical amplifier 6, even for the light having the wavelength transmitted through the wavelength multiplexer and demultiplexer 5, the reflected light for the pulse light does not return from a position farther than the optical amplifier 6. In many cases, there is only a patch cord having a length about several meters to several tens of meters between the optical amplifier 6 and the wavelength multiplexer and demultiplexer 5, and a difference in arrival distance between the wavelength that may be transmitted through the wavelength multiplexer and demultiplexer 5 and the wavelength that may not be transmitted is approximately equal to the length of the patch cord. Therefore, since the optical transceiver 4 is required to have high distance resolution, it is also required to narrow the pulse width of the pulse light.

Based on these points, the OTDR control unit 40 obtains the maximum arrival distance without the optical amplifier from the maximum specification of the optical transceiver 4 in advance, and calculates a first pulse interval of the pulse light by (the maximum arrival distance without the optical amplifier×2/a light transmission speed in the optical fiber 3)+a margin. The OTDR control unit 40 calculates (for example, experimentally) pulse widths measurable up to maximum arrival distances for power of a plurality of pulse lights, and lists the pulse widths. When the power of the signal light is set for the optical transceiver 4, the power of the pulse light which does not exceed the power of the signal light is selected from the list, and the first pulse width of the pulse light corresponding to the power of the pulse light is selected. As a result, the OTDR control unit 40 sets the first pulse light (first test light) in a case with the first pulse width and the first pulse interval and without the optical amplifier 6.

The OTDR control unit 40 calculates a second pulse interval of the pulse light by (the measured arrival distance× 2/the light transmission speed in the optical fiber 3)+a margin from the arrival distance measured by the first pulse light set with the first pulse width and the first pulse interval (estimated to be a distance to the optical amplifier 6 in a case of the WDM system with an optical amplifier). The OTDR control unit 40 sets the second pulse width of the pulse light to a value where the distance resolution becomes equal to or less than one meter. As a result, the OTDR control unit 40 sets the second pulse light (second test light) in the case with the second pulse width and the second pulse interval and with the optical amplifier 6.

Figure 11:
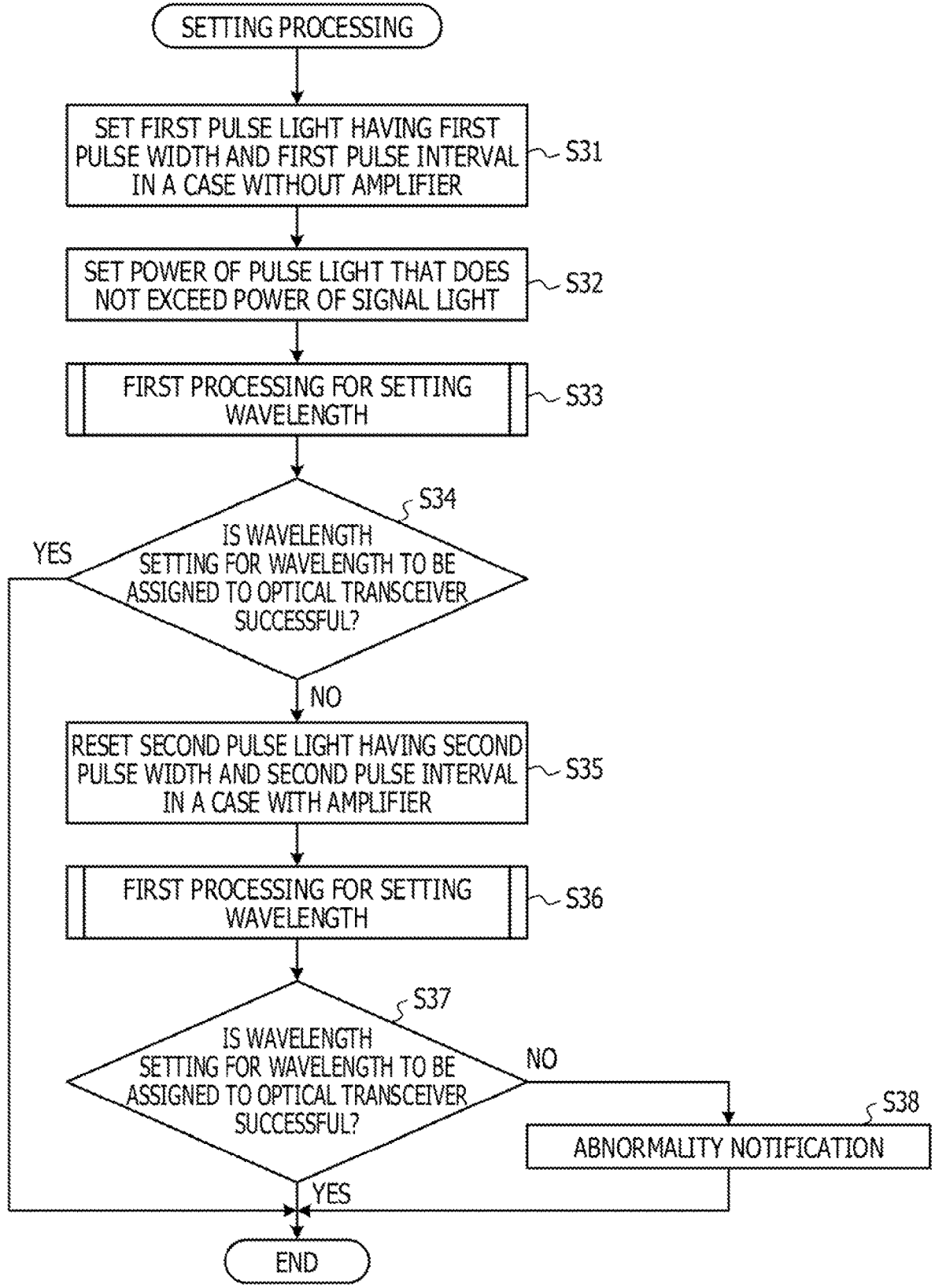
FIG. 11 is a flowchart illustrating an example of a processing operation of an optical transceiver related to setting processing according to the fourth embodiment.

FIG. 11 is a flowchart illustrating an example of a processing operation of the optical transceiver 4 related to setting processing according to the fourth embodiment. In FIG. 11, the OTDR control unit 40 in the optical transceiver 4 sets the first pulse light with the first pulse width and the first pulse interval assuming a state without the optical amplifier 6 (step S31). The first pulse interval is a pulse interval calculated by (the maximum arrival distance without an optical amplifier×2/the light transmission speed in the optical fiber 3)+a margin. The first pulse width is a pulse width corresponding to the power of the pulse light selected so as not exceed the power of the signal light. The OTDR control unit 40 sets so that the power of the first pulse light does not exceed the power of the signal light (step S32). The optical transceiver 4 performs the first processing for setting a wavelength illustrated in FIG. 7 by using the first pulse light in the setting of steps S31 and S32 (step S33).

The setting unit 45 determines whether or not wavelength setting for a wavelength to be assigned to the optical transceiver 4 is successful with the first pulse light in the first processing for setting a wavelength (step S34). When the wavelength setting is not successful (No in step S34), the OTDR control unit 40 sets the second pulse light with the second pulse width and the second pulse interval assuming a state with the optical amplifier 6 (step S35). The second pulse interval is a pulse interval recalculated by (the measured arrival distance×2/the light transmission speed in the optical fiber 3)+a margin from the arrival distance measured by the first pulse light. The second pulse width is a pulse width which is reset to a value where the distance resolution is equal to or less than one meter. The optical transceiver 4 performs the first processing for setting a wavelength by using the second pulse light in the setting of step S35 (step S36). The setting unit 45 determines whether or not the wavelength setting for the wavelength to be assigned to the optical transceiver 4 is successful (step S37). When the wavelength setting for the wavelength to be assigned is successful (Yes in step S37), the setting unit 45 ends the processing operation illustrated in FIG. 11.

When the wavelength setting for the wavelength to be assigned is not successful (No in step S37), the setting unit 45 notifies the terminal device of the operator of the abnormality (step S38), and ends the processing operation illustrated in FIG. 11. When the wavelength setting is successful (Yes in step S34), the setting unit 45 ends the processing operation illustrated in FIG. 11.

Since the optical transceiver 4 according to the fourth embodiment automatically sets the pulse interval and pulse width of the pulse light depending on the presence or absence of the optical amplifier 6 over the optical fiber 3, the appropriate pulse interval and pulse width of the pulse light may be set depending on the presence or absence of the optical amplifier 6.

The optical transceiver 4 generates the first pulse light having the first pulse interval and the first pulse width, when the optical amplifier 6 is not provided over the optical fiber 3. The optical transceiver 4 outputs the first pulse light to the optical fiber 3, detects a first reflected light for the first pulse light, and calculates an arrival distance based on the first reflected light. When the wavelength setting for the wavelength to be assigned is successful based on the arrival distances, the optical transceiver 4 sets the wavelength of the longest arrival distance as the assigned wavelength. As a result, the wavelength to be assigned to the optical transceiver 4 in the state where the optical amplifier 6 is not provided may be automatically set.

The optical transceiver 4 generates the second pulse light having the second pulse interval and the second pulse width when the wavelength setting for the wavelength to be assigned fails based on the arrival distances of the first pulse lights. The optical transceiver 4 outputs the second pulse light to the optical fiber 3, detects a second reflected light for the second pulse light, and calculates the arrival distance based on the second reflected light. When the wavelength setting for the wavelength to be assigned is successful based on the arrival distances, the optical transceiver 4 sets the wavelength of the longest arrival distance as the assigned wavelength. As a result, the wavelength to be assigned to the optical transceiver 4 in the state where the optical amplifier 6 is provided may be automatically set.

Although the AWG is illustrated as the wavelength multiplexer and demultiplexer 5 in the optical transmission apparatus 2 according to the first embodiment, a colorless directional reconfigurable optical add/drop multiplexer (CD-ROADM) may be substituted for the AWG. This embodiment will be described below as a fifth embodiment.

Fifth Embodiment

Figure 12:
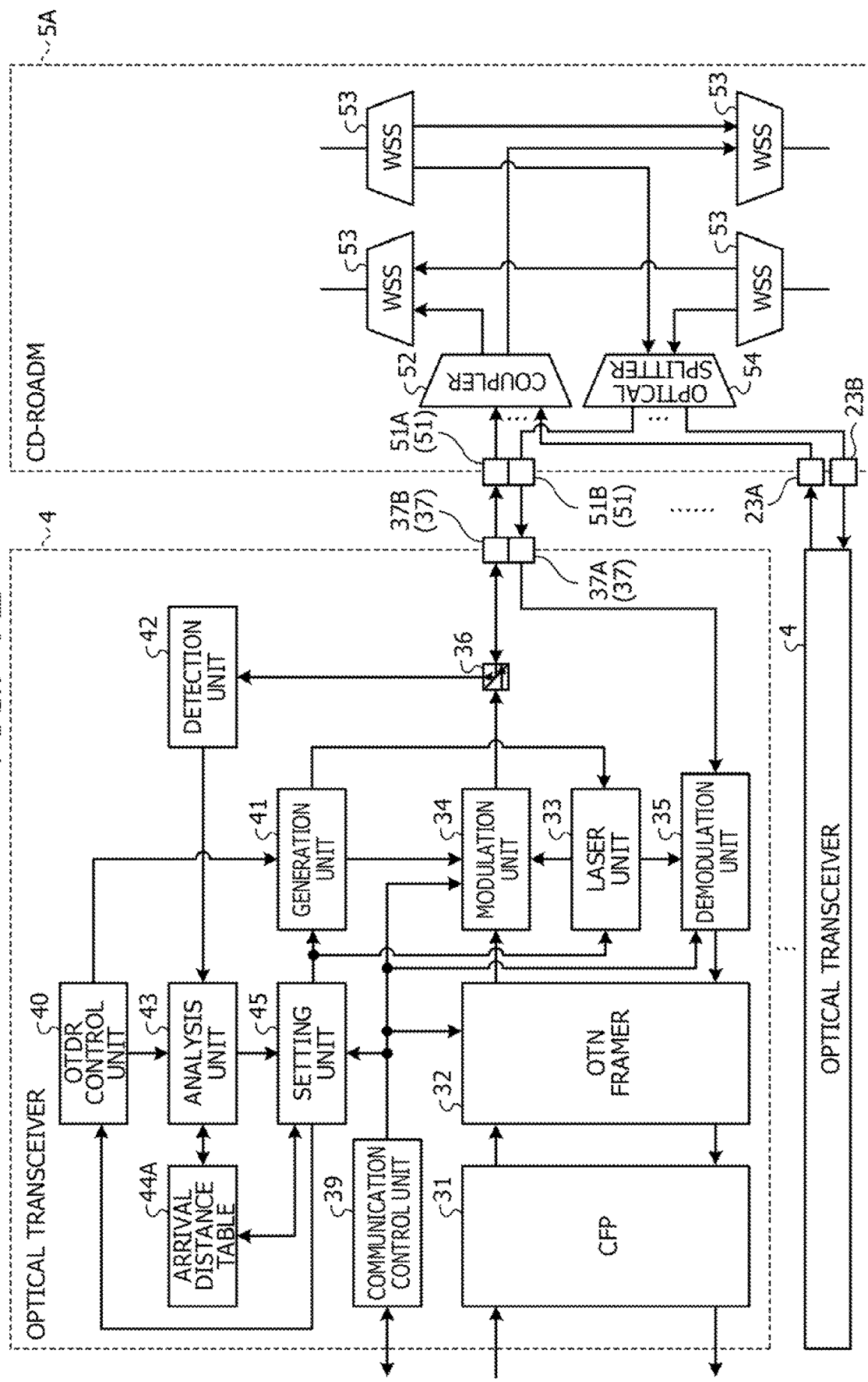
FIG. 12 is an explanatory diagram illustrating an example of an optical transmission apparatus according to a fifth embodiment.

FIG. 12 is an explanatory diagram illustrating an example of an optical transmission apparatus 2C according to the fifth embodiment. The optical transmission apparatus 2C illustrated in FIG. 12 differs from the optical transmission apparatus 2 illustrated in FIG. 1 in that a CD-ROADM 5A is disposed in place of the wavelength multiplexer and demultiplexer 5 (AWG). The CD-ROADM 5A is a reconfigurable optical add/drop multiplexer that transmits and receives a signal light by distributing the signal light to an appropriate route for each wavelength.

The CD-ROADM 5A includes an input connector 51A (51), an output connector 51B (51), an optical coupler 52, a plurality of wavelength selective switches (WSS) 53, and an optical splitter 54. The input connector 51A of the CD-ROADM 5A allows all assignable wavelengths to be transmitted therethrough, is connected to the output connector 37B of the optical transceiver 4, and is connected to the optical coupler 52. The output connector 51B of the CD-ROADM 5A allows all assignable wavelengths to be transmitted therethrough, is connected to the input connector 37A of the optical transceiver 4, and is connected to the optical splitter 54. The optical coupler 52 multiplexes signal lights having different wavelengths from the respective optical transceivers 4, and outputs the WDM light after multiplexing to the WSS 53. The WSS 53 outputs the WDM light of any wavelength group in the WDM light to the optical fiber 3.

The WSS 53 receives the WDM light from the optical fiber extracts the WDM light of any wavelength group out of the WDM light after receiving the light, and outputs the WDM light of the extracted any wavelength group to the optical splitter 54. The optical splitter 54 outputs the WDM light from the WSS 53 to the respective optical transceivers 4. Each optical transceiver 4 extracts the signal light having the assigned wavelength from the WDM light, and demodulates the extracted signal light.

FIG. 13 is an explanatory diagram illustrating an example of an arrival distance table 44A. The arrival distance table 44A illustrated in FIG. 13 manages the wavelength of the pulse light, an in-use flag, and the arrival distance in association with one another.

The OTDR control unit 40 in the optical transceiver 4 determines whether or not the assigned wavelength of the pulse light is the wavelength currently being used in the WDM light, when setting parameters of the pulse light having the wavelength assignable to the WDM light for the laser unit 33. Whether or not the wavelength is currently being used is determined based on whether or not an optical signal is received with the wavelength by using the demodulation unit 35. The analysis unit 43 in the optical transceiver 4 stores the in-use flag of "no" for the wavelength of the pulse light in the arrival distance table 44A, when the assigned wavelength of the pulse light is the wavelength currently being used in the WDM light. When the assigned wavelength of the pulse light is currently being used in the WDM light, the generation unit 41 does not generate the pulse light having the wavelength, but sets parameters of a pulse light having an unset wavelength that is next assignable, for the laser unit 33 and the modulation unit 34. As a result, the generation unit 41 may avoid collision between the wavelength of the signal light currently being used in the WDM light and the wavelength of the pulse light. The laser unit 33 generates the pulse light having the unset wavelength, and outputs the pulse light having the unset wavelength to the modulation unit 34. The modulation unit 34 outputs the pulse light having the unset wavelength to the output connector 37B via the optical circulator 36.

The optical coupler 52 in the CD-ROADM 5A multiplexes pulse lights from the respective optical transceivers 4 via the input connector 51A, and outputs the WDM light after multiplexing to the WSS 53. The WSS 53 outputs the WDM light to the optical fiber 3.

The detection unit 42 detects the reflected light for the pulse light in the WDM light, from the input connector 51A via the optical coupler 52. The analysis unit 43 calculates an arrival distance of the pulse light for each wavelength based on the reflected light for the pulse light for each wavelength. The analysis unit 43 stores the arrival distance of the pulse light and the in-use flag of "yes" for each wavelength in the arrival distance table 44A. The setting unit 45 refers to the arrival distance table 44A, and sets the wavelength of the longest arrival distance in which the in-use flag is "no" among the arrival distances of the pulse lights for the respective wavelength, as the assigned wavelength of the optical transceiver 4.

Figure 14:
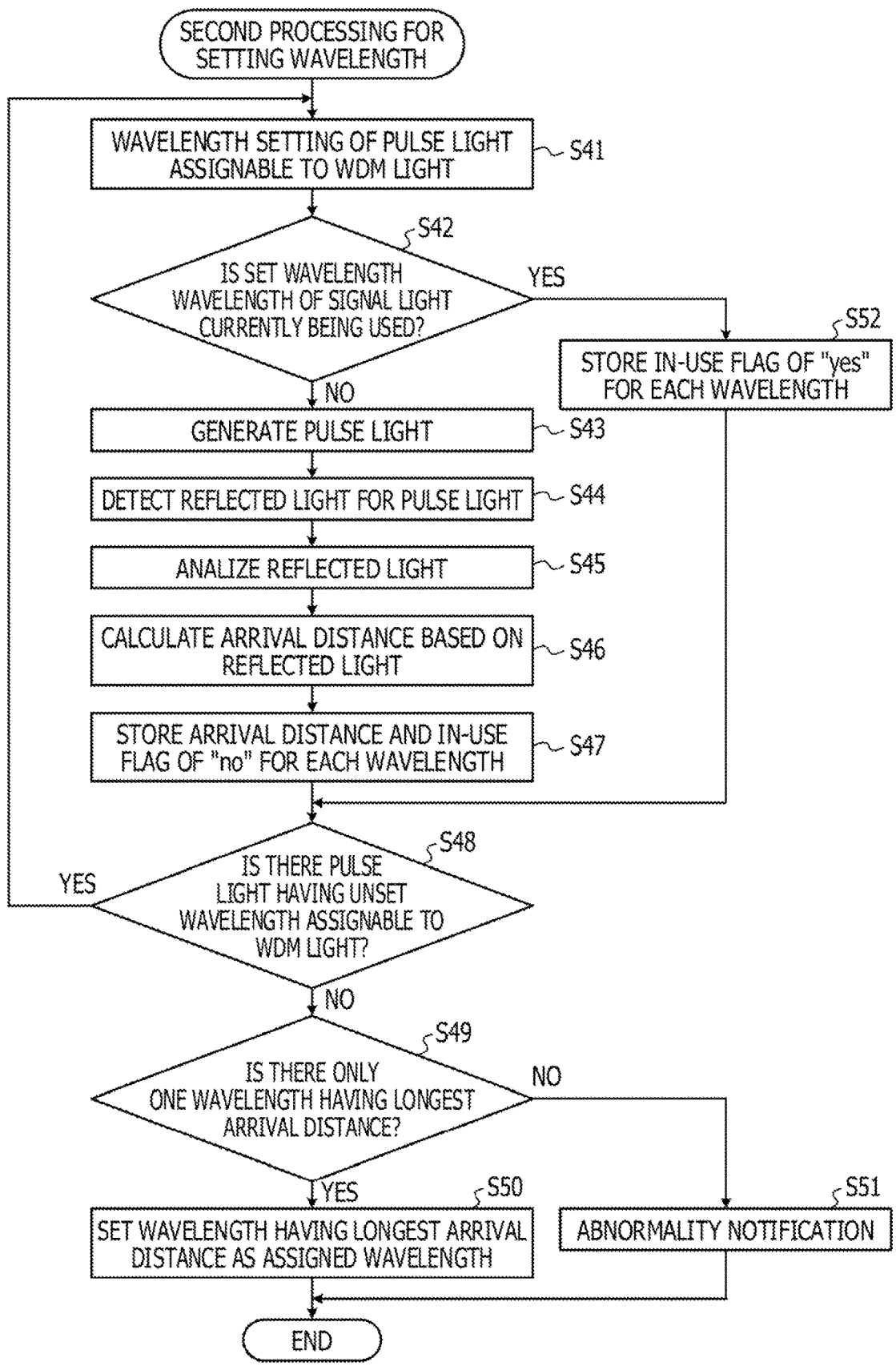
FIG. 14 is a flowchart illustrating an example of a processing operation of an optical transceiver related to a second processing for setting a wavelength.

Next, an operation of the WDM system 1 according to the fifth embodiment will be described. FIG. 14 is a flowchart illustrating an example of the processing operation of the optical transceiver 4 related to a second processing for setting a wavelength. In FIG. 14, the OTDR control unit 40 in the optical transceiver 4 sets the wavelength of the pulse light assignable to the WDM light (step S41). The OTDR control unit 40 determines whether or not the set wavelength of the pulse light is the wavelength of the signal light currently being used in the WDM light by using the demodulation unit 35 (step S42).

When the set wavelength of the pulse light is not the wavelength of the signal light currently being used in the WDM light (No in step S42), the generation unit 41 in the optical transceiver 4 generates the pulse light having the set wavelength, and outputs the generated pulse light to the optical fiber 3 via the CD-ROADM 5A (step S43).

The detection unit 42 in the optical transceiver 4 detects the reflected light for the pulse light from the CD-ROADM 5A (step S44). The reflected light is a reflected light, for example, such as an end surface reflected light or a backscattered light. The analysis unit 43 in the optical transceiver 4 analyzes the reflected light detected by the detection unit 42 (step S45). Based on the reflected light for the pulse light, the analysis unit 43 calculates the arrival distance of the pulse light for each wavelength of the pulse lights (step S46). The analysis unit 43 stores the arrival distance and the in-use flag of "no" for each wavelength of the pulse lights in the arrival distance table 44A (step S47). The OTDR control unit 40 determines whether or not there is a pulse light having an unset wavelength among wavelengths assignable to the WDM light (step S48). When there is a pulse light having an unset wavelength (Yes in step S48), the setting unit 45 in the optical transceiver 4 moves to step S41 to set the pulse light having the unset wavelength.

When there is no pulse light having an unset wavelength (No in step S48), the setting unit 45 refers to the arrival distance table 44A and determines whether or not there is only one wavelength having the longest arrival distance (step S49). When there is only one wavelength having the longest arrival distance (Yes in step S49), the setting unit 45 sets the wavelength having the longest arrival distance as the assigned wavelength of the optical transceiver 4 (step S50), and ends the processing operation illustrated in FIG. 14.

When there is not only one wavelength having the longest arrival distance (No in step S49), the setting unit 45 notifies the terminal device of the operator (not illustrated) of the abnormality notification (step S51), and ends the processing operation illustrated in FIG. 14.

When the set wavelength of the pulse light is the wavelength of the signal light currently being used in the WDM light (Yes in step S42), the analysis unit 43 stores the in-use flag of "yes" and the arrival distance of "no measurement" for the wavelength of the pulse light in the arrival distance table 44A (step S52). The OTDR control unit 40 proceeds to step S48 to determine whether or not there is a wavelength of an unset pulse light which is assignable.

In the optical transceiver 4 according to the fifth embodiment, the pulse light for each wavelength assignable to the WDM light is generated, and is transmitted to the optical fiber 3 via the CD-ROADM 5A to detect the reflected light for the pulse light from the optical fiber 3. The optical transceiver 4 calculates the arrival distance of the pulse light for each wavelength from the reflected light for each wavelength, and sets the wavelength having the longest arrival distance among the arrival distances for the respective wavelengths, as the assigned wavelength of the signal light to be assigned to the optical transceiver 4. As a result, it is not required to provide a special function to the CD-ROADM 5A, and the wavelength to be assigned to the signal light in the optical transceiver 4 coupled to the CD-ROADM 5A may be automatically set. Therefore, it is possible to reduce the work burden of the operator.

When generating the pulse light for each wavelength assignable to the WDM light, in a case where the set wavelength of the pulse light is the wavelength of the signal light currently being used in the WDM light, the optical transceiver 4 does not transmit the pulse light having the wavelength. As a result, it is possible to avoid wavelength collision between the pulse light and the signal light being used in the WDM light.

Although the optical transceiver 4 is exemplified in this embodiment, the optical transceiver 4 may be a transponder, a muxponder, or a plug-in module such as a CFP module, or a quad small form-factor pluggable (QSFP) module, and may be modified as appropriate.

In the optical transmission apparatus 2, for example, the CFP 31, the OTN framer 32, the laser unit 33, the modulation unit 34, the demodulation unit 35, the communication control unit 39, and the setting unit 45, corresponding to the transmission unit 11 and the reception unit 12 of the optical transceiver 4, may by mounted as a communication module of the optical transceiver 4, and may be modified as appropriate. In this case, for example, the optical transmission apparatus 2 may be configured such that the OTDR control unit 40, the generation unit 41, the detection unit 42, the analysis unit 43, and the arrival distance table 44 are mounted as another module, and may be modified as appropriate.

For example, the optical transceiver 4 is described as an example in which the transmission unit 11 and the reception unit 12 are incorporated, but is not limited thereto, and may be modified as appropriate.

Each constituent element of each part illustrated in the drawings is not necessarily configured physically as illustrated in the drawings. This means that, for example, specific forms of dispersion and integration of each part are not limited to those illustrated in the drawings, and all or part thereof may be configured by being functionally or physically dispersed or integrated in given units depending on various loads, the state of use, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus comprising:
   a plurality of optical transceivers including an optical transceiver; and
   a wavelength multiplexer and demultiplexer configured to multiplex lights output from the respective plurality of optical transceivers, output a multiplexed light to an optical transmission line, receive a wavelength multiplex light from the optical transmission line, demultiplex the received wavelength multiplex light, and output the demultiplexed lights to the respective plurality of optical transceivers, wherein
   the optical transceiver is configured to
   generate a test light for each wavelength assignable to the wavelength multiplex light to transmit the test light to the optical transmission line via the wavelength multiplexer and demultiplexer,
   detect a reflected light for the test light from the optical transmission line,
   calculate a distance from the reflected light that is associated with each of the test light for the each wavelength that has transmitted,
   select a wavelength having a longest distance among the distances for the respective wavelengths according to the calculated distances, and
   set the wavelength having the longest distance, as a wavelength to be assigned to the signal light in the optical transceiver.

2. The optical transmission apparatus according to claim 1, wherein
   the optical transceiver is configured to
   in a state in which the plurality of optical transceivers are coupled to connectors having different transmission wavelengths in the wavelength multiplexer and demultiplexer, set a wavelength having a longest distance among the distances for the respective wavelengths, as a wavelength to be assigned to the signal light in the optical transceiver coupled to a connector included in the connectors.

3. The optical transmission apparatus according to claim 1, wherein
   the optical transceiver is configured to
   generate the test light having a wavelength other than wavelengths currently being used in the wavelength multiplex light among wavelengths assignable to the wavelength multiplex light.

4. The optical transmission apparatus according to claim 1, wherein
   the optical transceiver is configured to
   in a state in which an optical amplifier for amplifying the wavelength multiplex light is not disposed over the optical transmission line, refer to a list of pulse widths measurable up to maximum distances for each power of the test light,
   select a first pulse width with which the power of the test light is less than power of a signal light in the optical transceiver,
   generate a first test light based on the selected first pulse width and a first pulse interval of the maximum distance,
   transmit the first test light to the optical transmission line,
   detect a first reflected light for the first test light from the optical transmission line,
   calculate a distance that the first test light for the each wavelength from the first reflected light for the each wavelength being transmitted,
   when wavelength assignment to the optical transceiver for the wavelength with which a distance of the first test light is the longest fails,
   calculate a second pulse interval and a second pulse width of a second test light based on the distance of the first test light,
   generate the second test light based on the second pulse interval and the second pulse width of the second test light, transmit the second test light to the optical transmission line, detect a second reflected light for the second test light from the optical transmission line, calculate a distance that the second test light for each of the wavelengths from the second reflected light for each of the wavelengths being transmitted, and set a wavelength with which the distance is the longest among the distances of the second test lights, as a wavelength to be assigned to the signal light in the optical transceiver.

5. A method for setting a wavelength to be executed by an optical transmission apparatus, the method comprising:

generating a test light for each wavelength;

transmitting the generated test light to an optical transmission line;

detecting a reflected light for the test light from the optical transmission line;

calculating a distance from the detected reflected light that is associated with each of the test light for each of the wavelength that has transmitted;

selecting a wavelength having a longest distance among distances, each of the distances correspond to the each wavelength according to the calculated distances, and setting the wavelength having the longest distance, as a wavelength to be assigned to a signal light to be generated by an optical transceiver included in the optical transmission apparatus.

6. The method according to the claim 5, wherein processing for setting the wavelength includes, in a state in which a plurality of optical transceivers including the optical transceiver are coupled to connectors having different transmission wavelengths in a wavelength multiplexer and demultiplexer, setting a wavelength with which the distance is the longest among the distances for the respective wavelengths as a wavelength to be assigned to the signal light in the optical transceiver coupled to a connector included in the connectors.

7. The method according to the claim 5, wherein the generating includes generating the test light having a wavelength other than wavelengths currently being used in a wavelength multiplex light among wavelengths assignable to the wavelength multiplex light.

8. The method according to the claim 5, wherein the generating includes, in a state in which an optical amplifier for amplifying a wavelength multiplex light is not disposed over the optical transmission line, referring to a list of pulse widths measurable up to maximum distances for each power of the test light, selecting a first pulse width with which the power of the test light is less than power of a signal light in the optical transceiver, and generating a first test light based on the selected first pulse width and a first pulse interval of the maximum distance of the optical transceiver, the processing for transmitting the generated test light to the optical transmission line includes transmitting the first test light to the optical transmission line, the processing for detecting the reflected light includes detecting a first reflected light for the first test light from the optical transmission line, and the processing for calculating the distance includes calculating a distance that the first test light for the each wavelength from the first reflected light for each of the wavelengths being transmitted, further comprising:

when wavelength assignment to the optical transceiver for the wavelength with which a distance of the first test light is the longest fails, calculating a second pulse interval and a second pulse width of a second test light based on the arrival distance of the first test light, generating the second test light based on the second pulse interval and the second pulse width of the second test light, transmitting the second test light to the optical transmission line, detecting a second reflected light for the second test light from the optical transmission line, calculating a distance that the second test light for the each wavelength from the second reflected light for the each wavelength being transmitted, and setting a wavelength with which the distance is the longest among the distances of the second test lights, as a wavelength to be assigned to the signal light in the optical transceiver.

9. An optical transceiver comprising:

an optical modulator configured to generate a test light for each wavelength assignable to a wavelength multiplex light obtained by multiplexing signal lights having different wavelengths from respective optical transceivers by a wavelength multiplexer and demultiplexer and output the wavelength multiplex light to an optical fiber;

a detector configured to detect a reflected light for the test light from the optical fiber; and a processor configured to:

calculate a distance based on the reflected light that is associated with the test light for each of the respective wavelengths, and a wavelength having a longest distance among the distances for the respective wavelengths according to the calculated distances, and set the wavelength having the longest distance, as a wavelength to be assigned to the signal light in the optical transceiver.

* * * * *